(12) United States Patent
Prosser et al.

(10) Patent No.: US 8,918,409 B2
(45) Date of Patent: Dec. 23, 2014

(54) SYSTEM AND METHOD FOR DETERMINING AFFINITY PROFILES FOR RESEARCH, MARKETING, AND RECOMMENDATION SYSTEMS

(75) Inventors: Steven H. Prosser, Mercer Island, WA (US); Gary Cliff Martin, Edinburgh (GB); Marius Octavian Buibas, Escondido, CA (US)

(73) Assignee: Semionix, Inc., Oak Harbor, WA (US)

( * ) Notice: Subject to any disclaimer, the term of this patent is extended or adjusted under 35 U.S.C. 154(b) by 804 days.

(21) Appl. No.: 11/745,310

(22) Filed: May 7, 2007

(65) Prior Publication Data

US 2007/0266048 A1    Nov. 15, 2007

Related U.S. Application Data

(60) Provisional application No. 60/747,135, filed on May 12, 2006.

(51) Int. Cl.
*G06F 17/30* (2006.01)
*G06N 5/04* (2006.01)
*G06Q 30/02* (2012.01)

(52) U.S. Cl.
CPC . *G06N 5/04* (2013.01); *G06Q 30/02* (2013.01)
USPC .......................................... 707/758; 707/802

(58) Field of Classification Search
USPC ................................................ 707/758, 802
See application file for complete search history.

(56) References Cited

U.S. PATENT DOCUMENTS

| | | | | |
|---|---|---|---|---|
| 5,890,152 | A * | 3/1999 | Rapaport et al. ...................... 1/1 |
| 5,909,678 | A * | 6/1999 | Bergman et al. ...................... 1/1 |
| 6,564,263 | B1 * | 5/2003 | Bergman et al. ............. 709/231 |
| 6,681,247 | B1 * | 1/2004 | Payton .......................... 709/217 |
| 7,640,511 | B1 * | 12/2009 | Keel et al. ...................... 715/769 |
| 7,660,868 | B1 * | 2/2010 | Kembel et al. ................. 709/217 |
| 2002/0024532 | A1 * | 2/2002 | Fables et al. .................. 345/700 |
| 2002/0099702 | A1 * | 7/2002 | Oddo ............................... 707/6 |
| 2003/0184598 | A1 * | 10/2003 | Graham ......................... 345/838 |
| 2004/0267816 | A1 * | 12/2004 | Russek ...................... 707/104.1 |
| 2005/0204294 | A1 * | 9/2005 | Burke ........................... 715/739 |
| 2006/0265414 | A1 * | 11/2006 | Loaiza et al. ................. 707/102 |
| 2006/0265420 | A1 * | 11/2006 | Macnaughton et al. ... 707/104.1 |
| 2007/0130193 | A1 * | 6/2007 | McNally et al. .............. 707/102 |

* cited by examiner

*Primary Examiner* — Son T Hoang
(74) *Attorney, Agent, or Firm* — Schwabe Williamson & Wyatt

(57) ABSTRACT

User affinity profiles are defined based upon analyzing the selection of users when they build personal expressions. A system is configured to display a plurality of user-selectable objects on each user system. Each user then selects and arranges the user-selectable objects to create a personal expression. The system analyzes the user selections across a number of personal expressions and defines the user affinity profiles based upon the analysis. The user affinity profiles can be useful for various purposes such recommending products, optimizing product packaging, and generating content that is meaningful to groups of users.

14 Claims, 20 Drawing Sheets

OVERALL PROCESSES

OVERALL PROCESSES

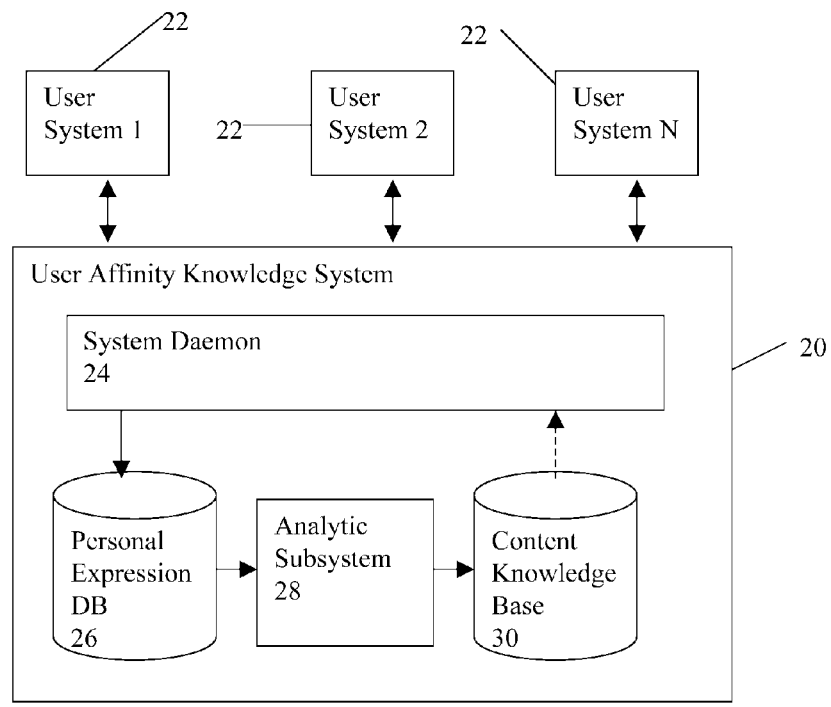
FIG. 2 SYSTEM BLOCK DIAGRAM
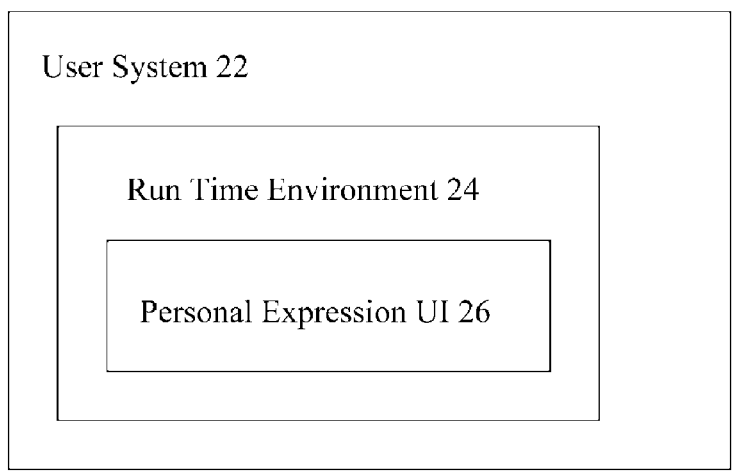
FIG. 3
USER SYSTEM

USER INTERFACE

PERSONAL EXPRESSION BUILDER

BUILDING A PERSONAL EXPRESSION

ACTIONS
PERFORMED
ON OBJECTS

PERSONAL
EXPRESSION
VIEWER

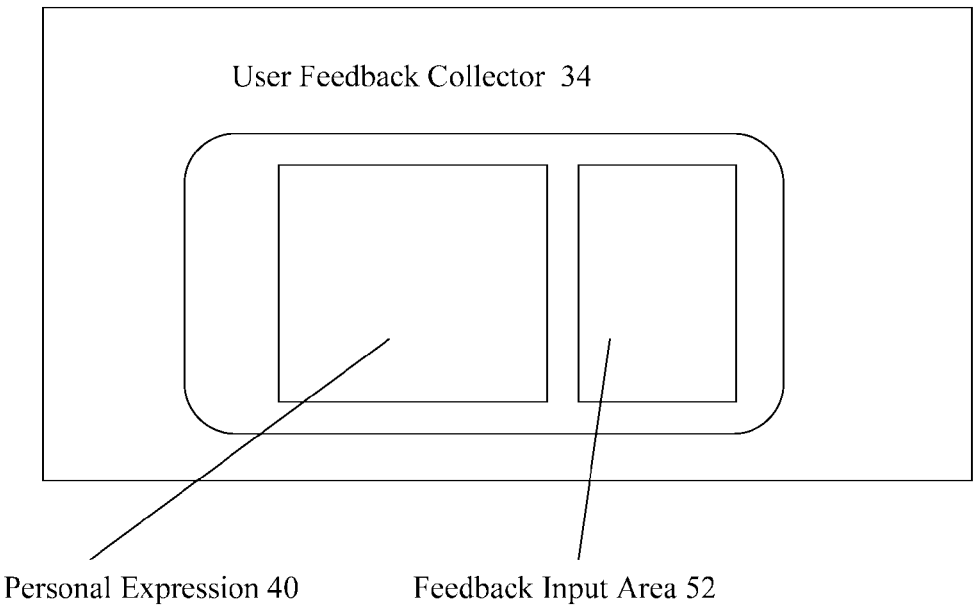
FIG. 10
USER FEEDBACK COLLECTOR
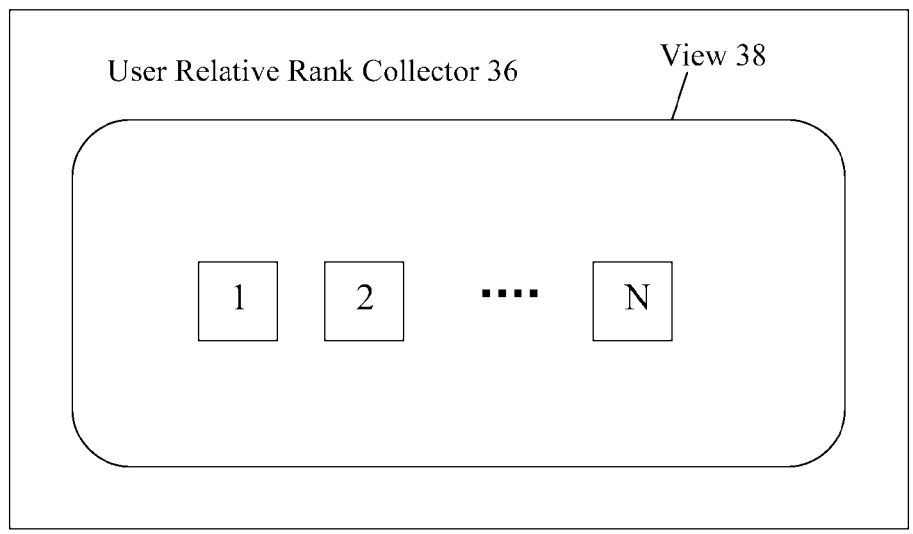
FIG. 11  USER RELATIVE
RANK COLLECTOR

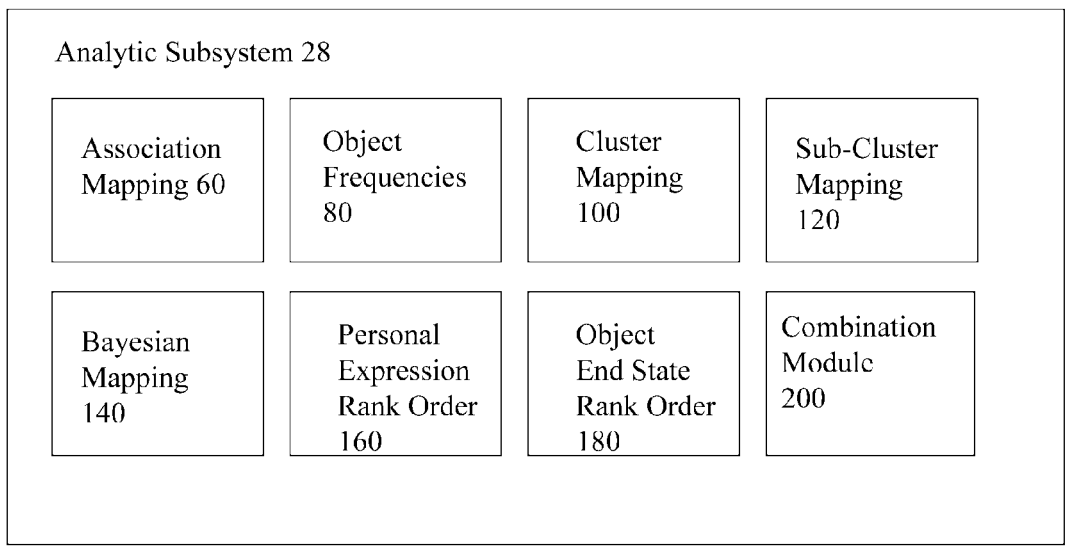
FIG. 12   ANALYTIC SUBSYSTEM

ASSOCIATION MAPPING 60

80 OBJECT FREQUENCIES

CLUSTER MAPPING 100

SUB-CLUSTER MAPPING 120

BAYESIAN MAPPING 140

PERSONAL EXPRESSION RANK ORDER 160

OBJECT END STATE RANK ORDER 180

AFFINITY CORRELATION

FIG. 22
OPTIMIZATION
OF ADS
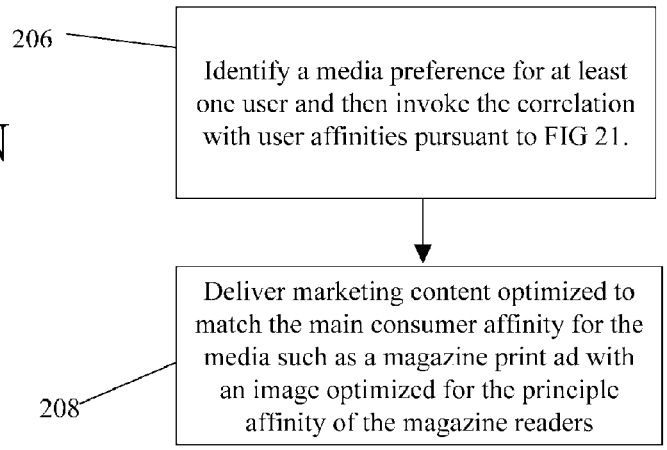
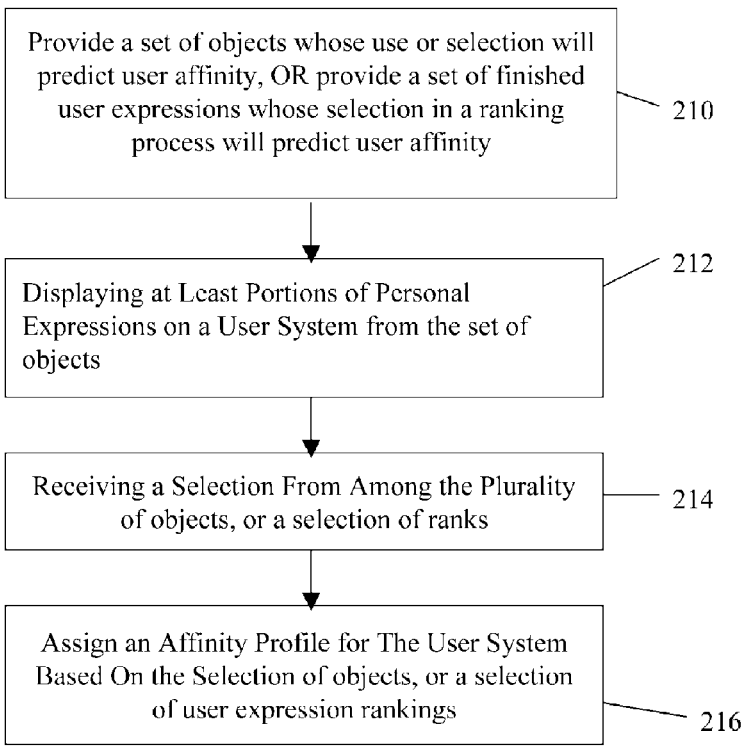
FIG. 23
AFFINITY
PROFILING

CLUSTER CORRELATION

DYNAMIC OPTIMIZATION OF MARKETING CONTENT

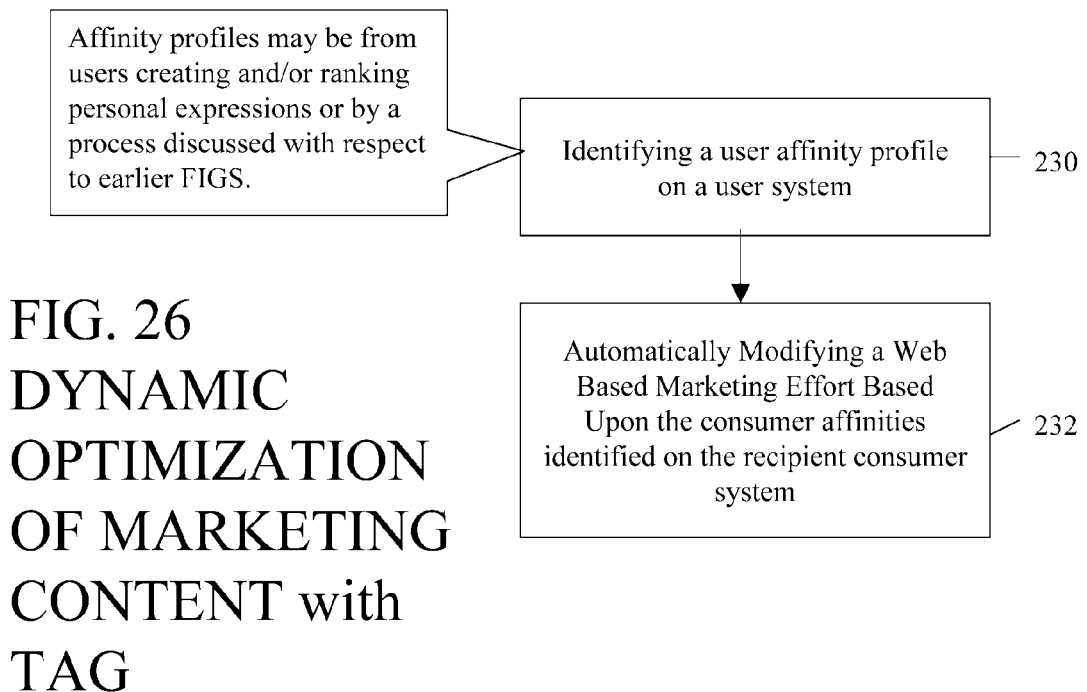
FIG. 26 DYNAMIC OPTIMIZATION OF MARKETING CONTENT with TAG

AFFINITY EXPANDED
RECOMMENDATIONS using
clustered users

AFFINITY EXPANDED
RECOMMENDATIONS using
user affinity profiles

SYSTEM AND METHOD FOR DETERMINING AFFINITY PROFILES FOR RESEARCH, MARKETING, AND RECOMMENDATION SYSTEMS

RELATED APPLICATIONS

This non-provisional patent application claims priority to U.S. Provisional Application Ser. No. 60/747,135, Entitled "System and Method for Determining Affinity Profiles for Research, Marketing, and Recommendations Systems", by Prosser et al., filed on May 12, 2006, incorporated herein by reference under the benefit of U.S.C. 119(e).

FIELD OF THE INVENTION

The present invention relates to systems and methods enabling the identification and application of user affinities in an automated and highly effective manner.

BACKGROUND OF THE INVENTION

Understanding meanings and predicting user responses is a highly challenging process that often ends in disappointing results. One reason marketing communications can fail is a lack of insight into the semiotics of and responses prompted by advertisements, packaging, or other marketing content. One reason recommendation systems can fail is the over reliance on techniques such as collaborative filtering technologies which cannot classify users apart from their purchase or web site visitation histories. The issues affecting the prediction and classification of consumer response are driven by shortcomings in current processes for analyzing user affinities.

One way user affinity insights can be obtained is through focus groups, surveys and interviews. These can be helpful in characterizing the consumer overall response to products, packaging, advertisements, and recommendations. However, these processes do not adequately account for how the component elements comprising a finished marketing communication affect users. For example, a favorably received advertisement may be composed of text and an image. Overall response to the advertisement, however, may not be fully optimized because the response to the image used is not fully consistent with the message in the text. These issues become increasingly important and difficult as companies strive to achieve greater personalization in their marketing communications.

Product or search recommendation systems often make recommendations based on previous purchases or searches. Because of this, the scope of these systems is limited to historic user activities. Other factors affecting user response to products are not directly evaluated. For example, if a user has only bought comedic movies, other movies recommended will most likely be other comedies. If the user demonstrates a strong emotional response to artistic expressions that juxtapose the themes of heroism and tragedy, the recommendation system will not account for this.

There is a need to obtain deeper insight into what causes consumer affinities based on the meanings and responses to marketing content, and products. These deeper insights cannot be readily obtained from the current, conventional methods of analysis.

BRIEF DESCRIPTION OF THE DRAWINGS

FIG. 2 is a block diagram representation of an exemplary ecosystem that enables the present invention.

FIG. 3 is a schematic representation of a user system.

FIG. 10 is a graphical representation of an interface for capturing user feedback regarding personal expressions.

FIG. 11 is a graphical representation of a portion of the user interface utilized when a user assigns a relative rank to previously created personal expressions.

FIG. 12 is a schematic representation of an analytic sub-system that is a portion of a user affinity knowledge system.

FIG. 22 is a process flow representation of a method whereby a media preference is utilized for the modification or optimization of marketing content based on an affinity profile.

FIG. 23 is a process flow representation of a method whereby a use or selection of objects, or a selection of rankings of finished expressions is used to assign an affinity profile.

FIG. 26 is a process flow representation of a way of dynamically modifying or optimizing marketing content based upon an existing user affinity profile.

DETAILED DESCRIPTION OF THE PREFERRED EMBODIMENTS

Figure 1:
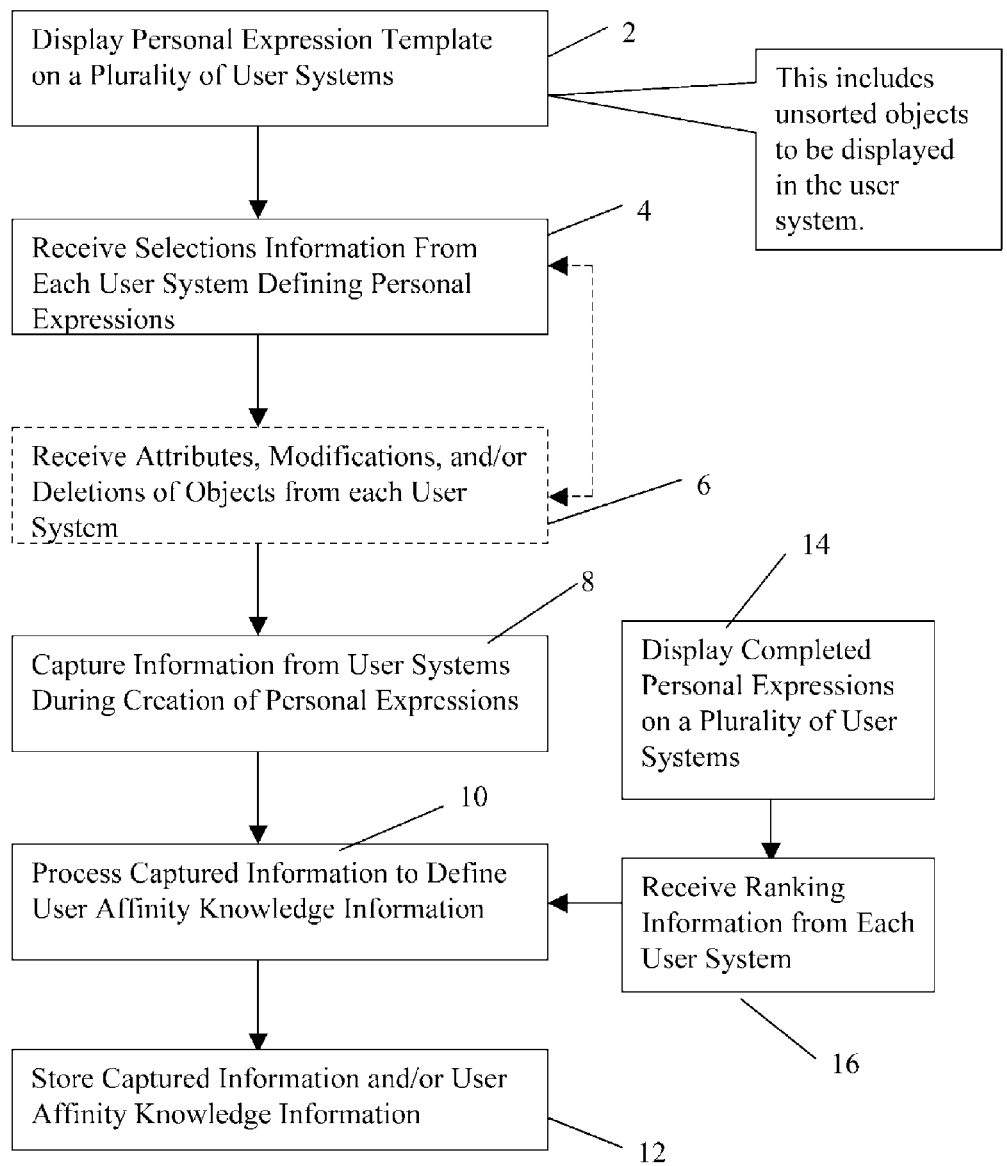
FIG. 1 is a process flow chart representation of a process for generating user affinity knowledge.

The present invention is a method for generating and applying knowledge about affinities expressed by a user, or groups or clusters of users. An affinity is a response that is affected by personal meanings and or emotions elicited from users. In the context of the present invention, a user is any person for which the goal is to understand affinities. A user can be a consumer and the goal can be for the purpose of understanding consumer affinities for purposes such as enhancing product, marketing communications, or recommendations. A user can alternatively be a business buyer and the goal can be to understand what aspects of a product or service are important to such a buyer. Other examples of users are possible with the one thing in common being a need or desire to understand their affinities.

An affinity is anything that has an affect upon the user where the affect is based on a special semiotic, or emotive for the user. An example of an affinity is an image for which the user has a strong positive association. Such an image might be a picture of a family playing, a mountain peak, a splash of water, etc. An affinity may be affected by the context in which a user is experiencing an object. For example, an image of a sleeping baby may have different affinities for a user when presented in unrelated contexts such as buying a car and buying health care insurance. Affinities may not be the same for all users even within the same context. Continuing with the example, the positive response to the image of the sleeping baby in a car advertisement may apply to married individuals, but not to single retirees with no children.

The concept of an affinity can be broader than an individual object, and can include concepts, attributes, appearances, experiences, objects, or combinations of objects that prompt specific meanings and/or emotive responses from users. It can also include sets or groups of objects that create an expression. For example, a series of objects may be grouped and positioned by a user in a manner that expresses an idea or emotion that is personally relevant, or emotionally meaningful to the user. Once completed, this personal expression becomes an object that can be used to measure affinities of other users either for the objects comprising the expression, or for the component and overall ideas, meanings, or emotions expressed by the combination of objects.

The present invention concerns a way of obtaining, and applying affinity knowledge from the way in which users select and associate objects or combinations of objects in an effort to create a personally relevant expression. In the context of the present invention, an object can include any one of the following:

A word, symbol, numerical or text character
A moving or still image
A video or audio/video clip
A sound, musical note, or other audio clip
A background image or graphic
Pre-defined groups of individual objects A result of a method of the present invention is to obtain an "affinity profile". This system of affinity profiles is built by prompting and analyzing user semiotic and emotive responses. An affinity profile is obtained by finding patterns that reveal for a user or for a group of users the semiotics of and/or emotional responses to objects and/or expressions composed of objects. As such, affinity profiles can be used to proactively discern and apply abstract elements such as meaning, and emotional response to marketing communications and recommendation systems.

Affinity profiles for a group may be found by first grouping users based on identifiable characteristics, and then analyzing patterns for the group. Group affinities may also be found by analyzing how semiotic and/or emotive patterns create distinct clusters of users within a larger group of users without any a priori assignment of users into a group.

A method of the present invention is depicted in process flow form in FIG. 1. As will become apparent, FIG. 1 actually depicts two alternative processes. In an exemplary embodiment, the method of FIG. 1 involves a plurality of individual users that each have a user system such as a personal computer. Each user system is coupled (for example by the internet) to a user affinity knowledge system that is used to capture information from user systems, and to process the information to generate the knowledge about user affinities (that may includes user affinity profiles assigned to clusters of users).

According to 2, a personal expression template is displayed on each user system. The personal expression template is a software tool that can be used by each user to create a personal expression. In an exemplary embodiment, the personal expression template displays a number of user selectable objects.

According to 4, the user utilizes the template to create a personal expression. In an exemplary embodiment, creating a personal expression includes selecting from among and configuring the user selectable objects to build a personal expression. A personal expression is, for example, a poem that reflects affinities of the user.

According to 6 (preferred embodiment) the user deletes, modifies, or changes attributes of objects. This would be a normal part of a creative process wherein an original "plan" for a personal expression changes as it is being created. A "user session" is defined during the creation of the personal expression according to elements 2, 4 and optionally 6.

According to 8 the knowledge system captures information from the user systems during the process of creating the personal expressions. According to 10 this information is processed to define affinity knowledge information.

Note that the processing as in 10 may be "real time" or it may occur after a number of users have created personal expressions. According to 12 the knowledge and/or information is stored by the user affinity knowledge system.

Once a number of personal expressions have been created another process may take place. According to 14 a plurality of personal expressions are displayed on a number of user systems. According to 16 each user ranks the personal expressions. The ranking information is then captured and processed to define affinity knowledge.

Examples of such knowledge might be any of the following:

Objects having Strongest Affinity or that are Most Often Selected
Percentage of User Utilizing Each Object in a Personal Expression
Personal Expressions having Strongest Affinity or Ranked Highest Objects Responsible for Highest Ranked Personal Expressions Combinations of Objects having Strongest Affinity Average Time Duration an Object Appears During User Sessions Average Time Duration Sets of Objects Appear During User Sessions Objects Typically Selected First or Last During User Sessions Affinity Profiles That Define the Above for Clusters of Users An exemplary ecosystem that enables the present invention is depicted in block diagram in FIG. 2. The ecosystem includes a user affinity knowledge system 20 that is in communication with or coupled to a plurality of user systems 22. Coupling knowledge system 20 and user systems 22 may be a network such as the internet (not shown). A user system 22 can be a personal computer, a cellular telephone, a PDA, a laptop or notebook computer, or any device that can provide functions required by the present invention.

Exemplary knowledge system 20 includes various components such as a system daemon 24, a personal expression database 26, an analytic subsystem 28, and a content knowledge base 30. Database 26 and knowledge base 30 can also exist as one database.

System daemon 24 performs administrative functions in system 20. Personal expression database 26 captures information during the creation or evaluation of personal expression as discussed with respect to element 8 of FIG. 1.

Analytic subsystem 28 is a software module configured to process (according to element 10 of FIG. 1) or analyze information captured when personal expressions are created and/or evaluated. The processing or analysis performed by analytic subsystem 28 results in user affinity knowledge that is stored in knowledge base 30.

User system 22 is further depicted in FIG. 3. Within user system 22 is a run time environment 24 such as an AJAX or Adobe/Macromedia Flash environment within a web browser or other environments such as widget, or kiosk interface. Within the run time environment 24 is a personal expression user interface 26 that is utilized for creating, viewing, and ranking personal expressions.

Figure 4:
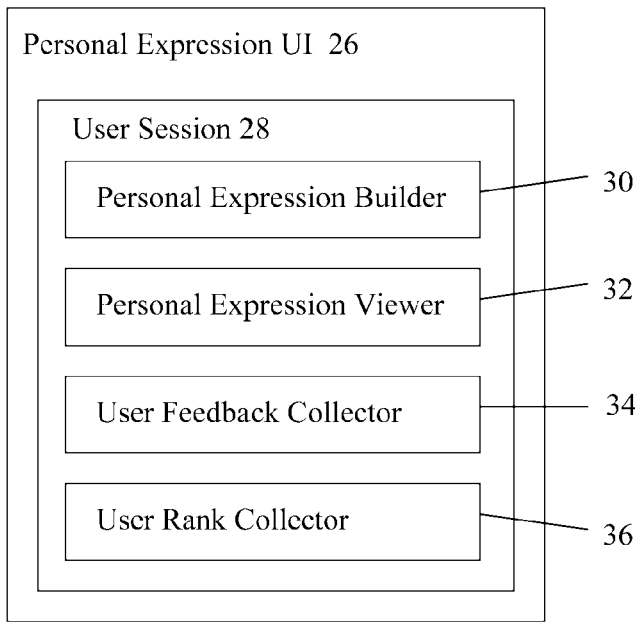
FIG. 4 is a schematic representation of a user interface utilized by the present invention.

FIG. 4 depicts the personal expression user interface 26. Within the personal expression user interface a user session 28 is defined. Defined within a user session 28 is alternatively or in combination a personal expression builder or template 30, a personal expression viewer 32, a user feedback collector 34, and a user rank collector 36. Depending on the user system 22 elements 32-36 can be displayed at the same time or during separate sessions.

Personal expression builder 30 is the builder or template that provides tools enabling a user to build a personal expression. Personal expression viewer 32 allows a user to view a personal expression. User feedback collector 34 enables a user to view a personal expression while entering qualitative or quantitative feedback such as comments or like/dislike scale measures that are received by user affinity knowledge system 20. User rank collector 36 enables a user to rank or indicate a relative preference for previously created personal expressions.

Figure 5:
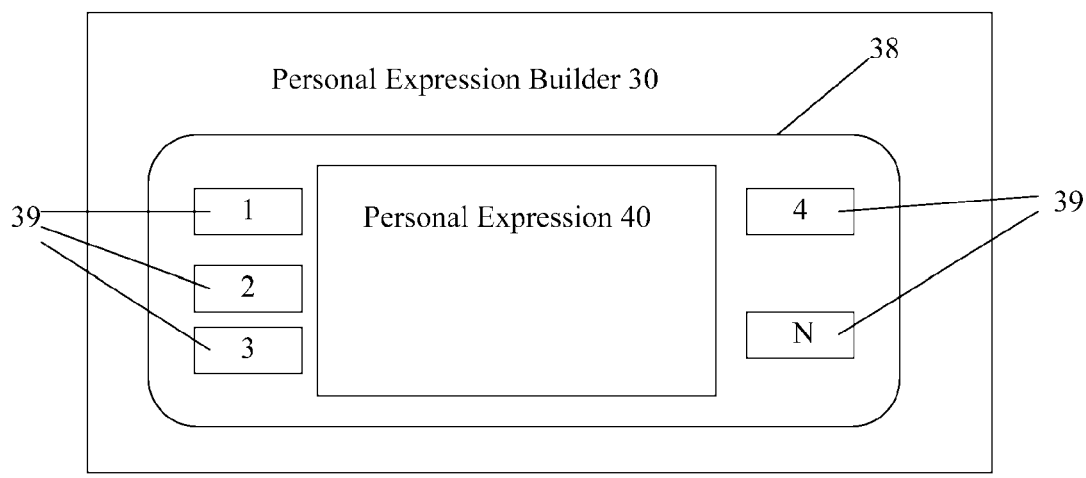
FIG. 5 is a graphical representation of a portion of the user interface referred to as a personal expression builder or template.

FIG. 5 depicts a personal expression builder or template 30. Template 30 includes a view 38 within which a personal expression 40 is to be constructed by selecting and placing objects 39 into position within personal expression 40. Personal expression 40 as depicted in FIG. 5 does not yet contain any objects except perhaps an already selected background (that may be the first object selected). As a note, some objects such as sounds or music may not have a "position" in the geometric sense.

Figure 6:
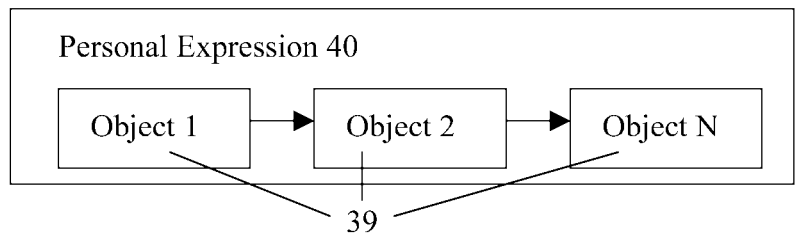
FIG. 6 is a representation of the process used for building a personal expression.

FIG. 6 depicts the construction of a personal expression 40 by selecting and placing objects 39 into a region of the view 38 to be covered by personal expression 40. In a preferred embodiment, personal expression 40 is constructed by "dragging and dropping" objects 39 into personal expression 40. Although FIG. 6 only depicts a few objects being selected for personal expression 40 it is to be understood that any number of objects 39 can be selected for a personal expression 40 and that personal expressions 40 may vary widely in complexity.

Figure 7:
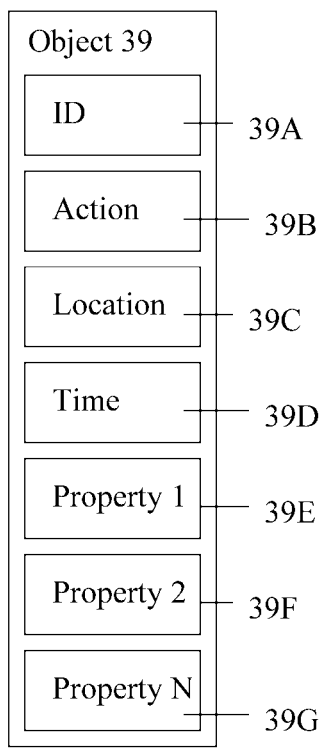
FIG. 7 is a representation of information associated with a single object utilized during the creation of a personal expression.
Figure 8:
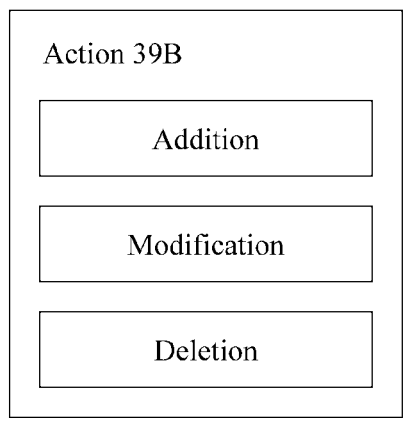
FIG. 8 is a representation of actions performed on an object.

FIGS. 7 and 8 depict information 39A-G defining the status an object 39 during and after the creation of a personal expression. Each object has an ID 39A (identification) associated therewith. An action 39B can include an addition, modification or deletion.

The location 39C is indicative of where an object is placed upon the personal expression 40 when it is selected. As discussed earlier, some elements such as music or sound clips may not have a location. Time 39D is indicative of a time of addition (and deletion if applicable) and any other operations performed on object 39. Properties (39E-G) are other aspects and/or attributes of object 39. Any or all of information depicted by elements 39A-G can be collected for each object that is placed in personal expression 40.

We can refer to the building and ranking of personal expressions as "user sessions". Information 39A-G is obtained during each user session.

Figure 9:
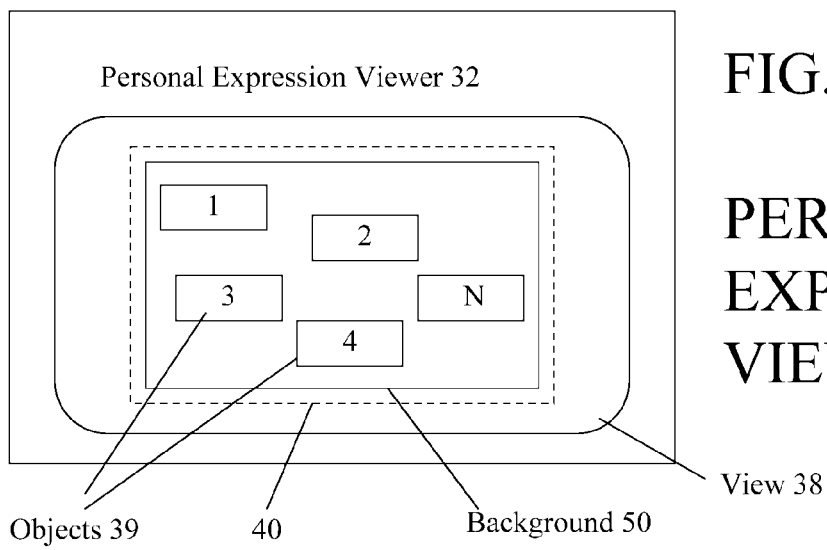
FIG. 9 is a graphical representation of a personal expression viewer.

FIG. 9 depicts personal expression viewer 32 (and is similar in appearance of the personal expression builder during a user session of building a personal expression 40) after a personal expression 40 has been at least partially defined in view 38. Personal expression 40 includes a background 50 and objects 39. Some of the objects included in personal expression 40 can be sounds or music.

FIG. 10 depicts user feedback collector 34 including personal expression 40 and feedback input collector 52. A user may view a personal expression 40 and provide qualitative and/or quantitative input using collector 52. Alternatively element 52 may refer to an audio input such that a user may verbally comment on a personal expression 40.

FIG. 11 depicts user rank collector 36. Within view 38 the user ranks personal expressions relative to all expressions within view 38 such as expression 1 being a favorite, expression 2 being a next favorite, and so on. Ranking personal expressions is discussed with respect to elements 14 and 16 of FIG. 1.

When a user builds a personal expression as discussed with respect to FIGS. 1-11 the user affinity knowledge system captures information. After or during this process, the analytic subsystem 28 processes the information and in so doing generates user affinity knowledge. This knowledge is based on processing the data captured during creation of personal expressions. Examples of the type of user affinity knowledge generated are the following:

Selection of or affinity to Objects: What objects are preferred. A simple example is a rank order from the most commonly selected object to the least commonly selected. A second example would be the percentage of users that utilized each object as a part of a personal expression. A third example would be the average amount of time each object was part of a personal expression averaged over the user sessions.

Association of Objects: The strength of association between objects. One metric might be what pairs or sets of objects appeared most frequently together in personal expressions. Another metric might be the average duration of time that each pair or set of objects appeared together in a personal expression. Another metric might be the relative proximity between two objects or two sets of objects in a personal expression.

Bayesian Association of Objects: The tendency of the selection of one object or set of objects to precede the selection of a second.

User Clustering: Looking for points of concentration of users such as selection of individual objects, combinations of objects, associations of objects, ranking of personal expressions, etc. Cluster analysis techniques can be utilized for this purpose. An example of cluster analysis is the K-means cluster analysis. The result of cluster analysis may be one or more clusters of users that each have a user affinity profile associated therewith.

Other Methods: Maximum entropy modeling is a form of statistical modeling of a random process. Graphical methods and graph theory can also be utilized. These are but a few of the possible analysis tools that can be utilized in analytic subsystem 28.

An exemplary embodiment of analytic subsystem 28 is depicted with respect to FIG. 12. When a number of users build personal expressions, information is collected based upon their selection, placement, and deletion of objects, and ranking of personal expressions. Analytic subsystem 28 includes a plurality of software modules that process this information to define user affinity knowledge and user affinity profiles. Exemplary software modules include objects 60, 80, 100, 120, 140, 160, 180 and 200 of FIG. 12.

Figure 13:
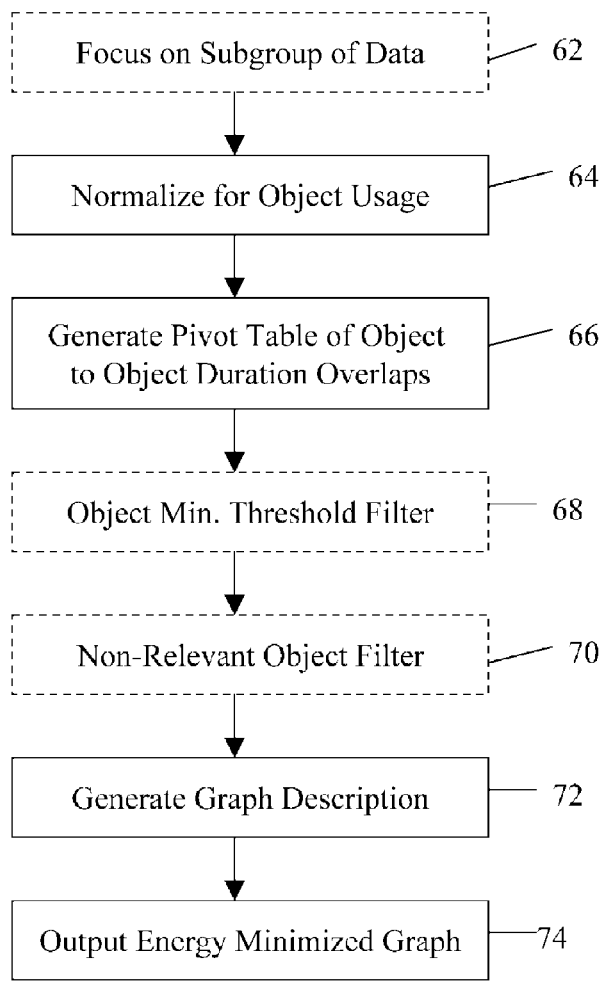
FIG. 13 is a flow chart representation of an exemplary association analysis software module used to identify associative links between different objects for groups of users.

FIG. 13 is a flow chart representation of an exemplary embodiment of association-mapping module 60. The use of dashed boxes in flow chart or process flow representations indicates optional processes or steps although some boxes with solid lines are also optional. The association-mapping module 60 obtains knowledge about user affinities using the associations between pairs or sets of objects. According to this embodiment, this is related to durations of time (within the user session) during which pairs or sets of objects were all positioned within a personal expression.

According to 62, module 60 optionally selects a subset of the users for which to process the information. For example, this may be performed in the case in which only certain demographics of users are to be studied. Use of a subset of users is optional.

According to 64, data normalization takes place. For example, some users may have built multiple personal expressions or may take much longer than others to build personal expressions. Both of these types of users may tend to skew (or influence in excess) the data from the group. Data normalization according to 64 reduces the tendency to skew the data.

According to 66, a pivot table (or other data analysis tool) is generated for each pair or set of different objects containing information on durations of their overlaps. For each pair or set of objects—object X and object Y—the duration of the overlap equals the duration of time during which both object X and object Y were present on the personal expression during a user session.

According to 68, data from individual user selections or individual users is eliminated when it falls below a certain threshold. In an exemplary embodiment rarely or briefly used objects may be omitted due to low statistical relevance. The resultant data may be eliminated from the analysis. Use of a threshold is optional.

According to 70, non-relevant objects are eliminated from the analysis. For example, if objects include word objects, then words like "and", "or", "the", etc. may be eliminated since they are not part of the content being studied.

According to 72 a graph description is generated from the pivot table or data set. A graph description is a translation of the information in the Pivot Table into a format that can be used to generate a graph or by other analytic modules. A graph description may not be required.

According to 74 an energy-minimized map is generated that depicts the results. An energy minimized map is a two dimensional representation of the objects that makes it easy to visualize the results. In one embodiment groups of objects with the strongest associations will tend to be near the center of the map with smaller distances between them. Objects that are not strongly associated with others will tend to be in the periphery of the map with greater distances between them.

Energy minimized graphs are produced with standard graph visualization software. They are often used for graphing networks.

Figure 14:
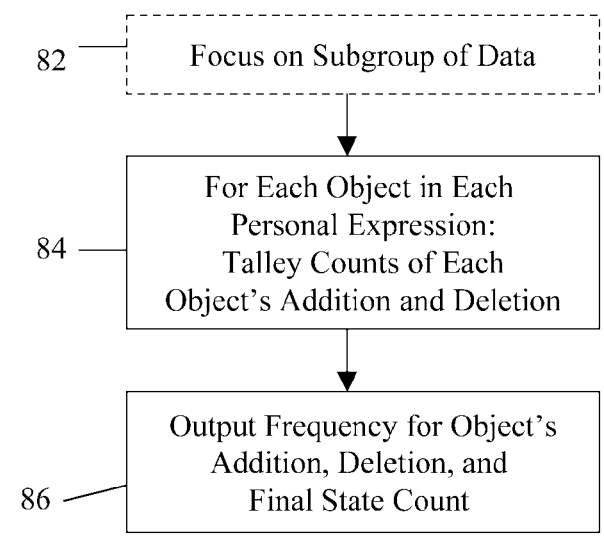
FIG. 14 is a flow chart representation of an object frequencies software module used to analyze affinity for certain objects.

FIG. 14 is an exemplary flow chart representation of an exemplary embodiment of module 80 that generates "object frequency" information. The object frequency correlates with the percentage of users that selected a particular object. This may be normalized for users that created more than one personal expression.

According to 82, module 80 selects a subset of the users for which to process the information. This may be performed in the case in which only certain demographics of users are to be studied, for example. Use of a subset of the users is optional.

According to 84, for each object in each personal expression a count or tally of addition and deletion takes place for each object. For each object this determines (1) how many times has it been selected and (2) how many times it has been deleted.

According to 86 a final tally or average is generated for each object across the data. This provides the average (per user and/or per personal expression) indicative of how many additions, deletions, and final state for each object. Knowledge generated includes:

Average final state for the object (indicative of additions minus deletions). For example, what percentage of the personal expressions contained an object or set of objects when completed.

How often the object was deleted. For example, a high frequency of deletions may indicate a difficulty in associating the object with other objects. It may be a preferred individual object, but not complement other objects.

Figure 15:
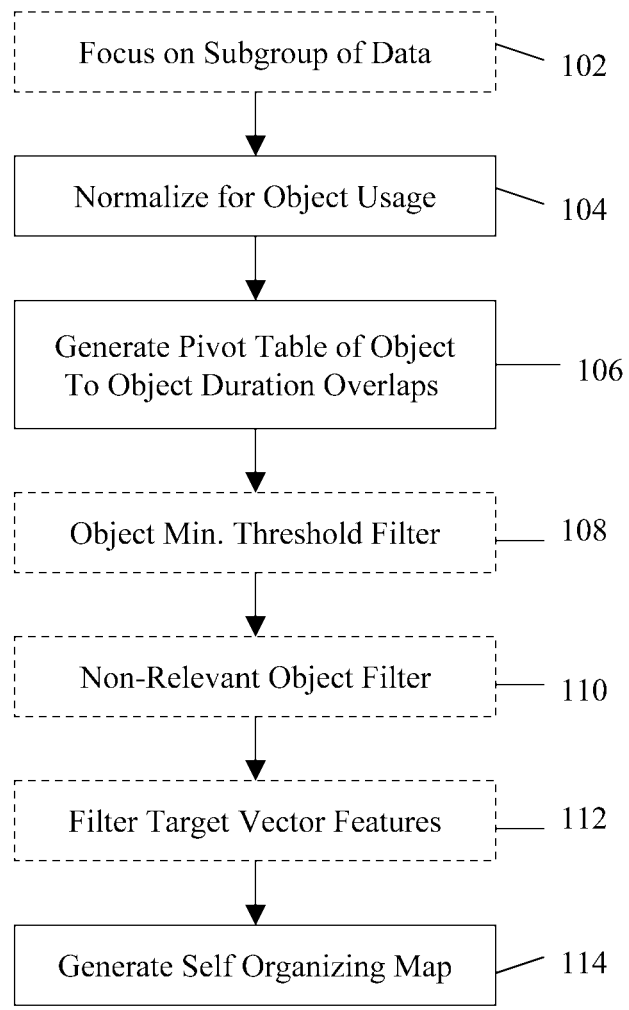
FIG. 15 is a flow chart representation of a cluster mapping software module used to analyze associative links between different objects for groups of users.

FIG. 15 is an exemplary flow chart representation of "cluster mapping" module 100 that results in generation of Self Organized Maps. This is done to visually show equivalency between personal expression objects. Objects used in similar ways will be clustered together in the self-organized map. Those that are more dissimilar will be spatially separated.

According to 102, module 100 selects a subset of the users for which to process the information. This may be performed in the case in which only certain demographics of users are to be studied, for example. Selecting a subset is optional.

According to 104, data normalization takes place in a manner similar to element 64 of FIG. 13. According to 106, a pivot table (or other data analysis tool) is generated for each pair or set of different objects containing information on durations of their overlaps in a manner similar to element 66 of FIG. 13. Elements 108 and 110 are similar to elements 68 and 70 described with respect to FIG. 13.

According to optional process 112 selected object vector features are removed from this analysis to simplify the analysis. This makes the relationships between objects of high interest more clear.

According to 114 a SOM (self organized map) is generated that depicts object similarity. More similar objects are placed closer together on this map. Stated another way, objects that are used in similar ways tend to be clustered closer together.

Figure 16:
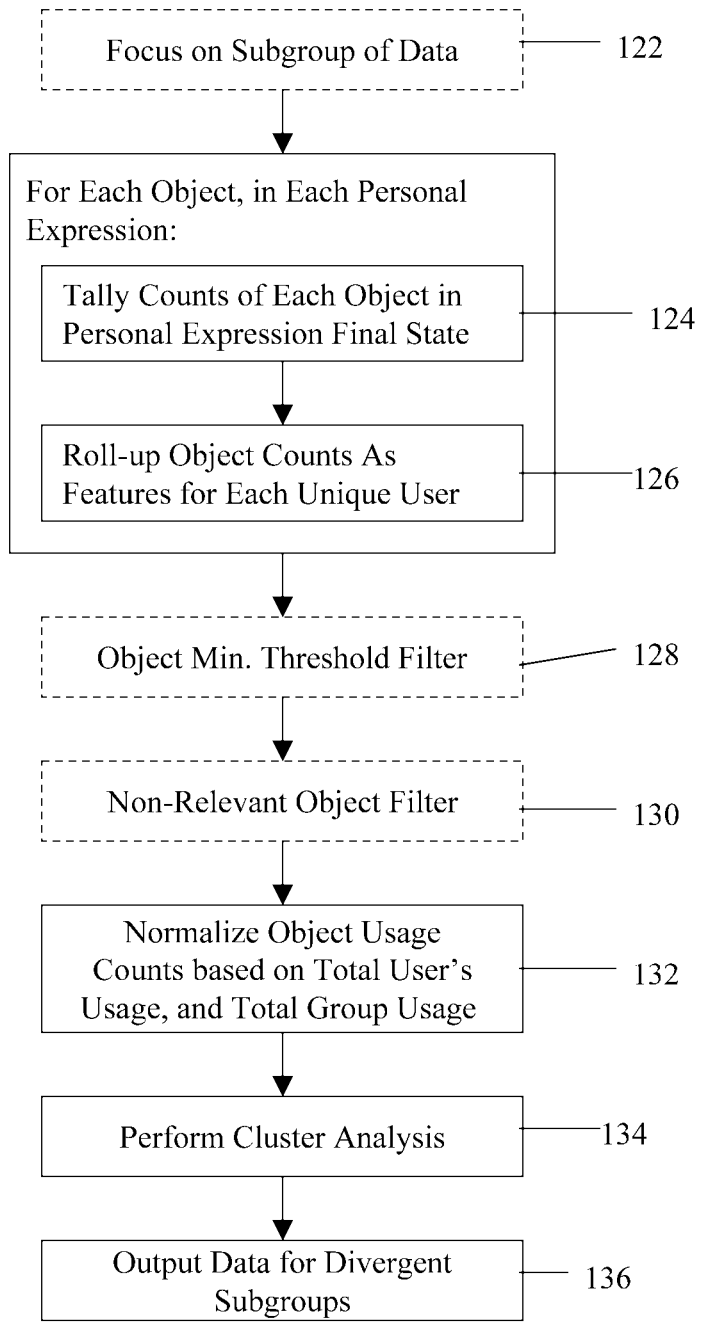
FIG. 16 is a flow chart representation of a sub-cluster mapping software module used to identify groups of users based upon their affinities.

FIG. 16 is an exemplary flow chart representation of "sub-cluster" mapping module 120. Sub-cluster analysis is performed to define groups of users with similar affinity characteristics. Stated another way, the results of this process define sub-clusters of users that share a characteristic affinity profile. The method of flow chart 16 is exemplary in that there are other ways of clustering users according to the present invention.

According to 122, module 120 selects a subset of the users for which to process the information in a manner similar to that discussed with respect to element 62 of FIG. 13. According to 124, the counts of additions and deletions are counted (# additions−# deletions) to determine the final state of each object for each personal expression.

According to 126, the objects used (and counts of each that remain in the final state of each personal expression) for each unique user are determined. The processes performed according to 128 and 130 are similar to elements 68 and 70 discussed with respect to FIG. 13.

According to 132 the object counts are normalized. This can be done in any number of ways. In one embodiment correction is made for a user who has created more than one creative expression.

According to 134 a cluster analysis is performed that would tend to group users according to their selections of objects. There are various known methods of cluster analysis such as K-means clustering.

According to 136 data is output for each separate cluster. This can be done in a tabular manner and/or graphically.

Figure 17:
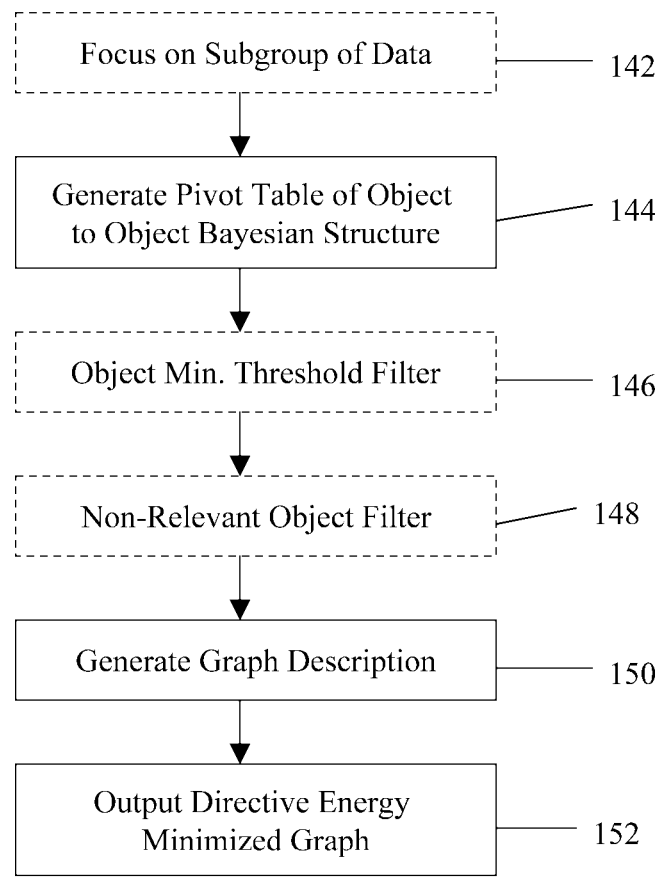
FIG. 17 is a flow chart representation of a Bayesian mapping software module used to analyze the tendency of selection of one object to follow another.

Note the sub-cluster mapping discussed with respect to FIG. 16 is one example of cluster analysis that can be used to define groups or clusters of users having similar affinity profiles. Examples of criteria that can be used to define the affinity profiles are as follows:

Object Preferences or Selections or Affinities
Object to Object Association Affinities or Preferences
Personal Expression Preferences or Affinities
Combinations of the Above FIG. 17 is an exemplary flow chart representation of a Bayesian analysis module 140. Module 140 analyzes the tendency for the selection of one object to precede another. Stated another way, module 140 generates information related to the order or sequence that objects are selected. According to 142, module 140 selects a subset of the users for which to process the information in a manner similar to that discussed with respect to element 62 of FIG. 13.

According to 144 a pivot table (or other data representation method) is generated containing object-to-object Bayesian structure. This table represents how much the selection of one object or set of objects led to the selection of another.

Elements 146 and 148 are similar to elements 68 and 70 discussed with respect to FIG. 13. According to 150, a graph description is generated. This is a translation of the information in the Pivot Table to a directive depiction that indicates the order of selection—object X→object Y indicates that object X tended to be selected prior to object Y.

According to 152, an energy-minimized graph is generated. This graph includes the directive information in the form of arrows, and would tend to have stronger objects and object associations toward the center.

Figure 18:
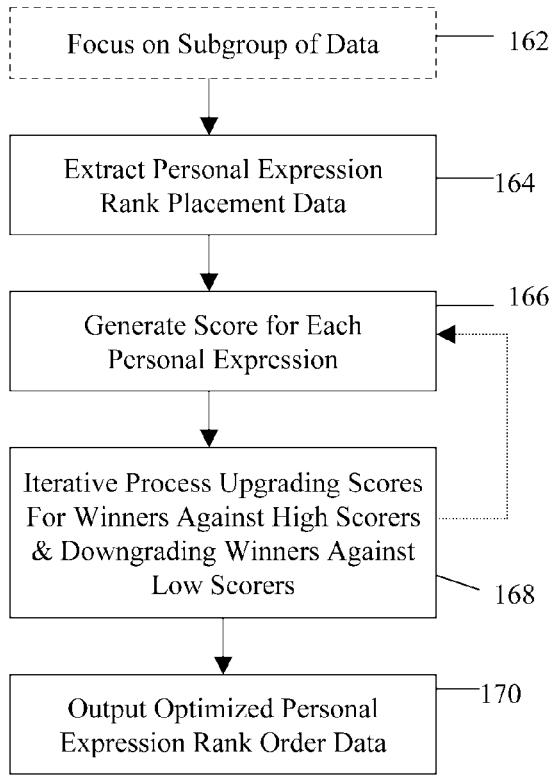
FIG. 18 is a flow chart representation of a personal expression rank order software module used to determine affinities for previously created personal expressions.

FIG. 18 is an exemplary flow chart representation of personal expression rank order module 160. Element 162 is similar to element 62 discussed with respect to FIG. 13.

According to 164 rank placement data is extracted. This ranking is performed as discussed with respect to FIG. 11 and element 16 of FIG. 1. An alternate or complementary source of rank data may also be extracted from qualitative or quantitative feedback as discussed with respect to element 52 of FIG. 10.

According to 166 a score is generated for each personal expression when using ranking data as discussed with respect to FIG. 11. According to 168 (and back to 166) an iterative process is performed wherein personal expression high scores are reduced for cases where they were ranked against lower ranking personal expressions. Likewise, lower scores are increased for personal expressions that had to compete with the higher-ranking personal expressions. Alternative or additional processes according to 166 and 168 may take place given use of feedback data as discussed with respect to element 52 of FIG. 10.

According to 170 rank order data is outputted that is indicative of user affinities to personal expressions.

Figure 19:
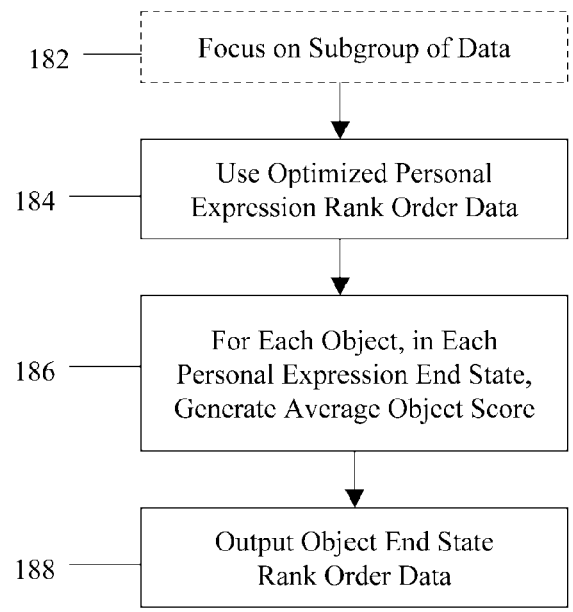
FIG. 19 is a flow chart representation of an object end state rank order software module used to determine what objects were most crucial in determining which personal expressions were preferred by users.

FIG. 19 is an exemplary flow chart representation of object end state rank order module 180. The purpose of object end state rank order module 180 is to determine which objects were the primary factors behind particular personal expressions having higher or lower ranks.

Optional element 182 is similar to element 62 discussed with respect to FIG. 13. According to 184 information such as that obtained from the process represented in FIG. 18 is provided.

According to 186 objects from each personal expression end state inherit the average personal expression rank order (as discussed with respect to FIG. 18) of all personal expression end states in which they appear. According to 188 the object rank order data is presented and is available for possible use in other modules.

FIGS. 20a-20d are intended to illustrate some exemplary user affinity knowledge that results from processing performed by analytical subsystem 28. As discussed earlier, affinity knowledge can include the meanings and/or emotional responses that a user has for a particular object or sets of objects. FIGS. 20a-20d may be similar to portions of self organizing maps or energy minimized maps discussed with respect to earlier figures.

Figure 20A:
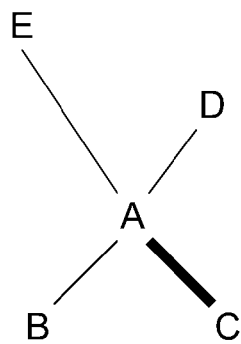
FIGS. 20a-d depicts examples of user affinity knowledge that can be obtained from the present invention.

FIG. 20a is an affinity node map displaying associations to object A. The strength of association can be depicted in various ways including by distance and line weight. In this example, based on proximity, object D has a stronger association with object A than does object E. Based on line weight, object C has the strongest association with object A as compared to the association of either object B, D, or E.

Figure 20B:
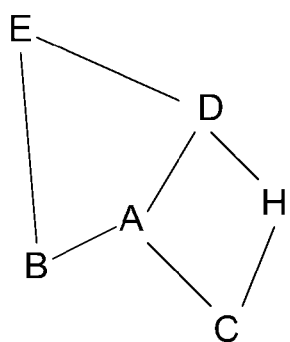

FIG. 20b is an affinity map displaying associations between a set of objects. The position of the objects on the map is representative of the relative strength of association between pairs or sets of objects. For example, in FIG. 20b, objects A and E are both associated with objects B and D. The closer proximity of B and D to object A indicate A has a stronger association with B and D relative to object E. Analytical techniques such as Self Organizing Mapping and Energy Minimized Graphs can be used to generate these maps. Some of these techniques were utilized with respect to the earlier figures.

Note that the type of knowledge displayed in FIGS. 20a, 20b, or similar types of graphical depictions can be utilized to compare and contrast different variables such as different groups or clusters of users. Clusters of users can be compared with a focus on individual objects as in FIG. 20a or to multiple associations between objects as in FIG. 20b. An exemplary method of comparison is to create separate maps for each variable being analyzed, and then juxtapose, switch, or overlay the separate maps.

Figure 20C:
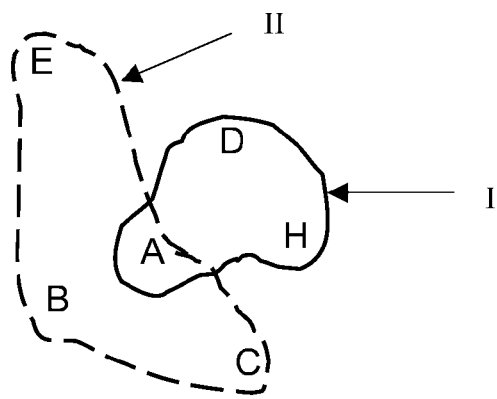

FIG. 20c depicts knowledge concerning the associations of sets of objects in order to highlight different variables in the analysis. FIG. 20c is not related to FIG. 20a or FIG. 20b. Identifying variables, and generating the position of the objects in the map based upon the combined effect of the variables on inter-object associations generate the Self Organizing Map in FIG. 20c. Variables being analyzed may include defined groups of users, or specific objects within the larger set of objects being analyzed.

Once the map representing the effect of multiple variables has been generated, the effect of each variable in the maps is highlighted in a manner such as the areas denoted I and II. For example, let the position of objects within the maps is determined by the combined associative effects for two demographic groups. The areas labeled I and II show a method of highlighting strong associations for each of the two groups.

According to FIG. 20c, the group labeled I has a strong level of association between objects A, D, and H as described by the solid line. The second group of users labeled II has a strong level of association between objects B, C, and E as described by the dotted line.

In another embodiment, the areas in FIG. 20c labeled I and II might represent the associations that result when the map is generated using an analysis that has objects A and B both affecting the placement of the objects in the map. In this example, the solid line would highlight the objects with the strongest relative associations for object A, and the dotted line represents strongest relative associations for object B.

The method of highlighting the affect of a variable might be to enclose an area using a bounding line as shown, or it may use a colored background where the intensity of the color represents the strength of association. When color backgrounds are used, areas of overlap can be made distinct by combining the colors to define a new color. Another approach to highlighting the affect of a variable may include connecting objects using lines of different color for each group. Different line widths or color intensities can be used to convey additional information. Boundaries, background colors, and connecting lines may all be used at the same time to convey multiple levels of information.

Figure 20D:
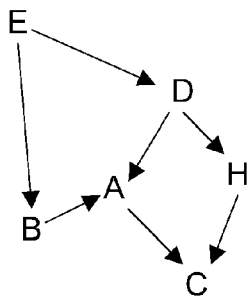

FIG. 20d is an affinity map displaying Bayesian relationships between a set of objects. Similar to FIG. 20b, the position of the objects on the map is representative of the relative strength of association between pairs or sets of objects. The arrows connecting the objects identify the Bayesian relationships between the objects or sets of objects. For example, arrows may indicate that a selection of object E tends to precede selection of objects B and D. Object B or D may tend to precede selection of object A.

In FIGS. 20a-d the objects A, B, C, D, E, etc., can represent users, entire personal expressions, or parts of personal expressions to name a few examples.

FIGS. 21-27 represent methods by which information developed from the methods described with respect to FIGS. 1-19 can be utilized to optimally generate marketing content, understand clusters of users, or enhance recommendation systems. In the following descriptions, "user affinity information or knowledge" can be any information or knowledge derived from users who have created personal expressions, ranked or evaluated personal expressions, or selected portions of personal expressions. "User affinity profiles" determine what clusters users belong to based upon user affinity knowledge.

Figure 21:
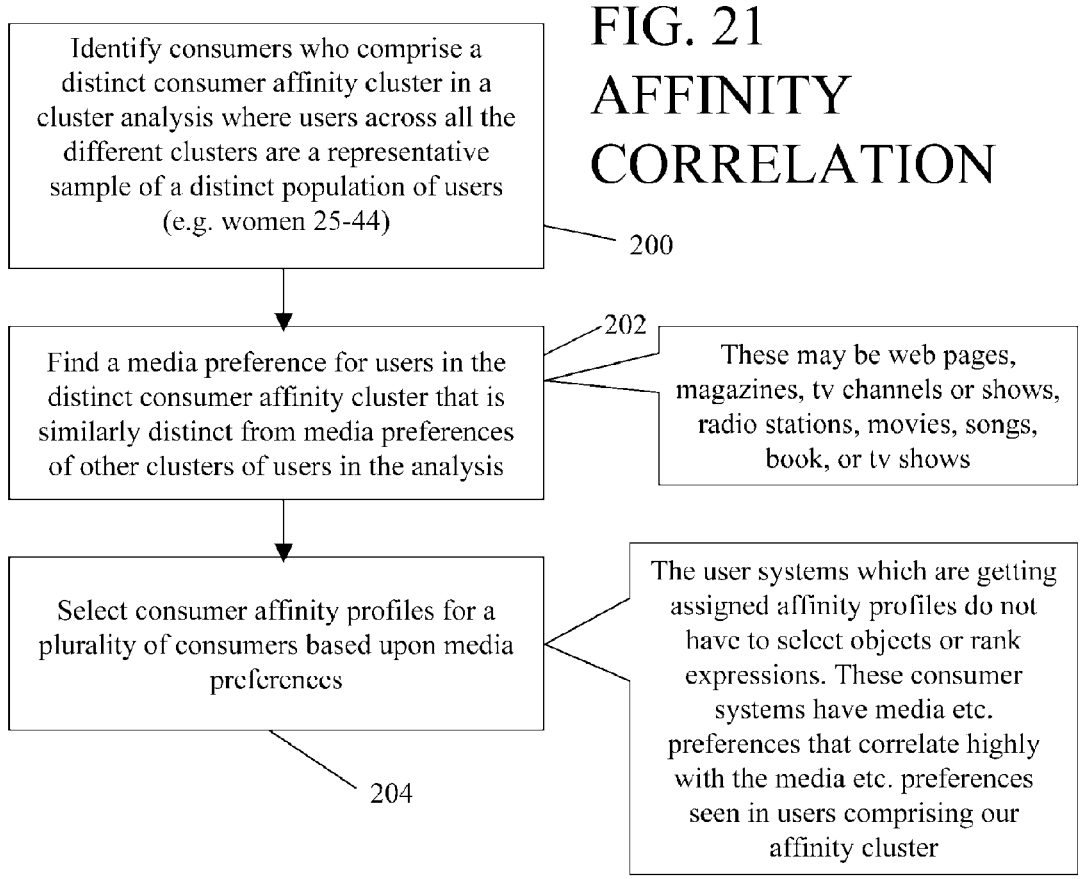
FIG. 21 is a process flow representation of a method whereby a user affinity profile is obtained from media preference information.

FIG. 21 is a process flow representation of an exemplary way in which user affinity information is inferred indirectly from certain media preferences. According to 200 a group of users is identified that is a "distinct user affinity cluster" based upon both user affinity information and a second criteria.

According to 202 a consistent media preference is identified for the distinct user affinity cluster. The media can be web pages, print media, video media, music media, or any combination of the above. A media preference can be indicated by a URL selection or bookmark, a newspaper or magazine subscription, a music or movie selection, a selection of a radio or television broadcast, to name a few.

According to 204, additional users are assigned user affinity profiles based upon media preference criteria. Thus, the additional users are assigned a user affinity profile based upon their preferences for media content by virtue of the correlation established according to 202.

FIG. 22 is a process flow representation of a way of delivering optimized marketing content such as optimized advertisements. According to 206, a media or media channel is assigned a principle affinity profile. This is pursuant to the process depicted in FIG. 21. According to 208 marketing content optimized for the user affinity profile is delivered to the user. The marketing content can be print media, a web-based advertisement, and broadcast content, to name a few examples.

FIG. 23 is a process flow diagram depicting a streamlined way of determining an "affinity profile" for a user when knowledge about particular affinities is known based upon earlier-created personal expressions. According to 210, a set of entire personal expressions, portions of personal expressions, or objects are provided that are strongly correlated to user affinities. The set of objects can be a subset of an original set of objects initially used to establish affinity profiles. The subset of objects can be chosen based on the strength of the objects predictive capacity for an affinity profile. For example, an affinity profile can be established based on user ranking of finished expressions as described in previous figures. Once complete, a subset of expressions may be identified for each affinity profile in a manner such that a user ranking this subset of expressions can be assigned an affinity profile with a high degree of confidence.

According to 212, a plurality of the objects, portions, or expressions from 210 is displayed on a user system. According to 214, information is received from the user system defining a ranking or selection of one or more of the objects, portions, or expressions. According to 216, the "affinity profile" is assigned to the user or user system from which the information is received.

Figure 24:
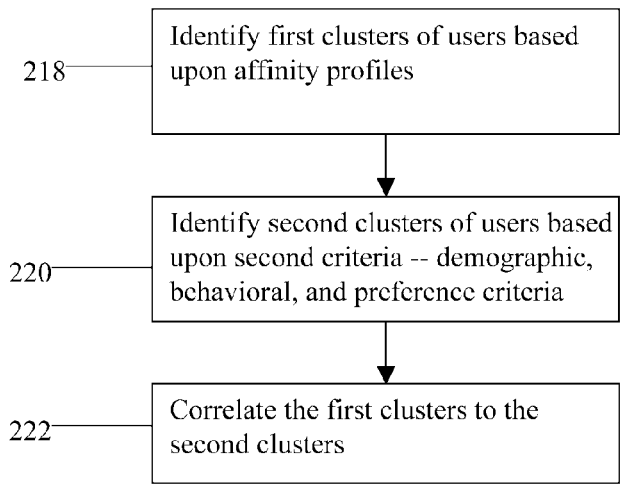
FIG. 24 is a process flow representation of a method of correlating a cluster of users having a certain affinity profile with a cluster of users having another characteristic such as a demographic profile, a behavioral characteristic, or a preference.

FIG. 24 is a process flow diagram depicting a way of correlating user affinity profiles to other types of profiles such as those based on demographic or behavioral criteria. According to 218 a first cluster of users is identified using affinity profiles obtained using processes described earlier.

According to 220 second cluster of users is identified from the group of users based upon other criteria such as demographics, behavior, or preferences (such as preferences for certain media).

According to 222 a correlation is made between the first and second clusters to relate the other criteria to the user affinity profiles.

Figure 25:
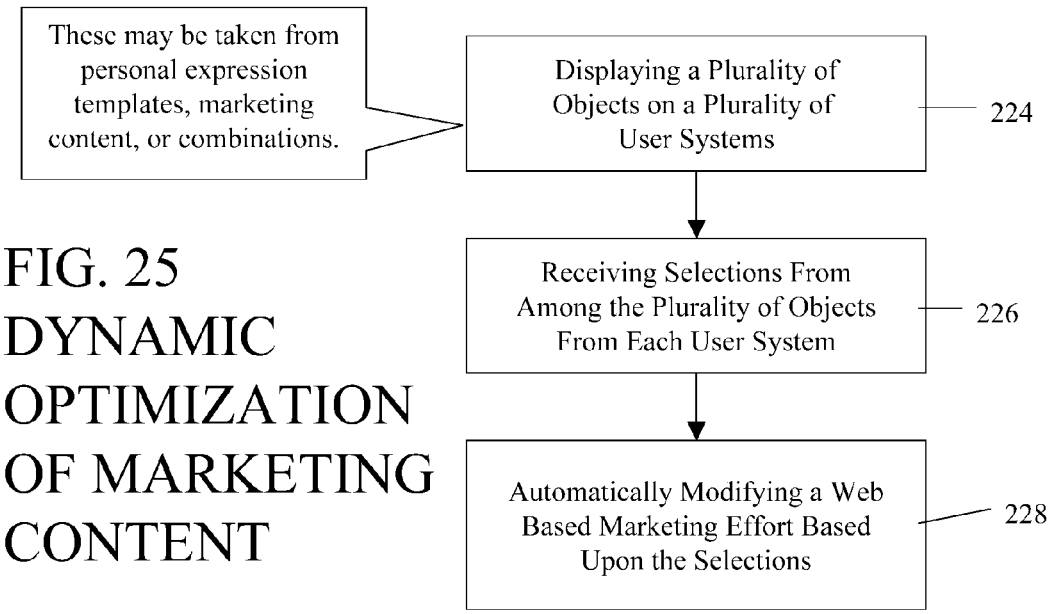
FIG. 25 is a process flow representation of a way of dynamically modifying or optimizing marketing content based upon user selection of objects identifying an affinity profile.

FIG. 25 is a process flow diagram depicting a way of automatically optimizing web-based advertisements or marketing content based upon user affinity when the user affinity is determined using objects integrated into the marketing content. The process described may include approaches for a multi-step method of marketing content delivery. For example, an advertising campaign may present a series of personal expressions to a user as part of a game or banner advertisement at a web site. Based on users interaction with the game or banner, such as selecting a favorite personal expression, the advertisement could deliver subsequent marketing content optimized for the affinity profile predicted by the user selection.

According to 224 a plurality of objects are displayed on a number of user systems as part of a marketing effort. The plurality of objects can, for example provide a means for assigning an affinity profile as described in element 210 of FIG. 23.

According to 226 a selection from among the objects is received from each of the user systems. According to 228 a web based marketing effort is automatically modified based upon the selections. Within 228 may be additional processes such as processing the information as discussed with respect to element 10 of FIG. 1.

FIG. 26 is a process flow diagram depicting a way of automatically modifying or optimizing web based marketing content based upon a pre-existing affinity profile for a user. This can further be described as targeted marketing based upon a user affinity profile.

According to 230 a user system is assigned a user affinity profile. This may be a result of a previously established identifier or tag (such as a "cookie") that defined the user affinity profile. According to 232 the profile is utilized to optimize the components of a marketing communication prior to its delivery to the user system.

Note that the affinity profile according to 230 may have been generated according to any methods previously discussed such as the methods discussed with respect to FIG. 1 and/or 23.

Figure 27A:
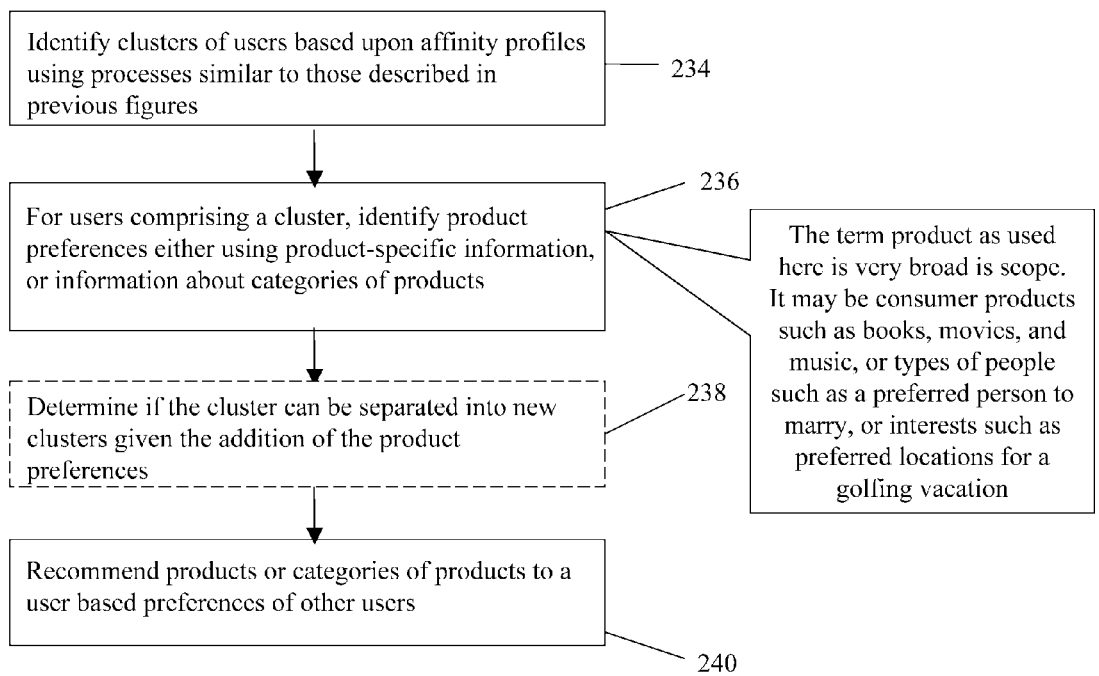
FIGS. 27A and 27B are process flow representations of methods to enhance a recommendation system using affinity profiles.

FIG. 27A is a flow chart representation of a way of using affinity profiles to expand recommendation systems using clusters of users. According to 234 clusters of users are identified by finding common affinity profiles. The user affinity profiles are determined using processes that are the same or similar to those discussed earlier.

According to 236 products or categories of products preferred by users within a cluster are identified. According to 238 the new information may be used to further segment the users comprising the affinity profile cluster. This is an optional step.

Finally, according to 240 products for a user in the cluster can be recommended by analyzing what other users in the cluster prefer. One embodiment of an expanded recommendation system is product purchase systems that tell users, "Users who purchased this product also purchased these other products". These systems would now have the option of telling users, "Users who purchased this product, and who have similar affinities as you also purchased these other products."

Figure 27B:
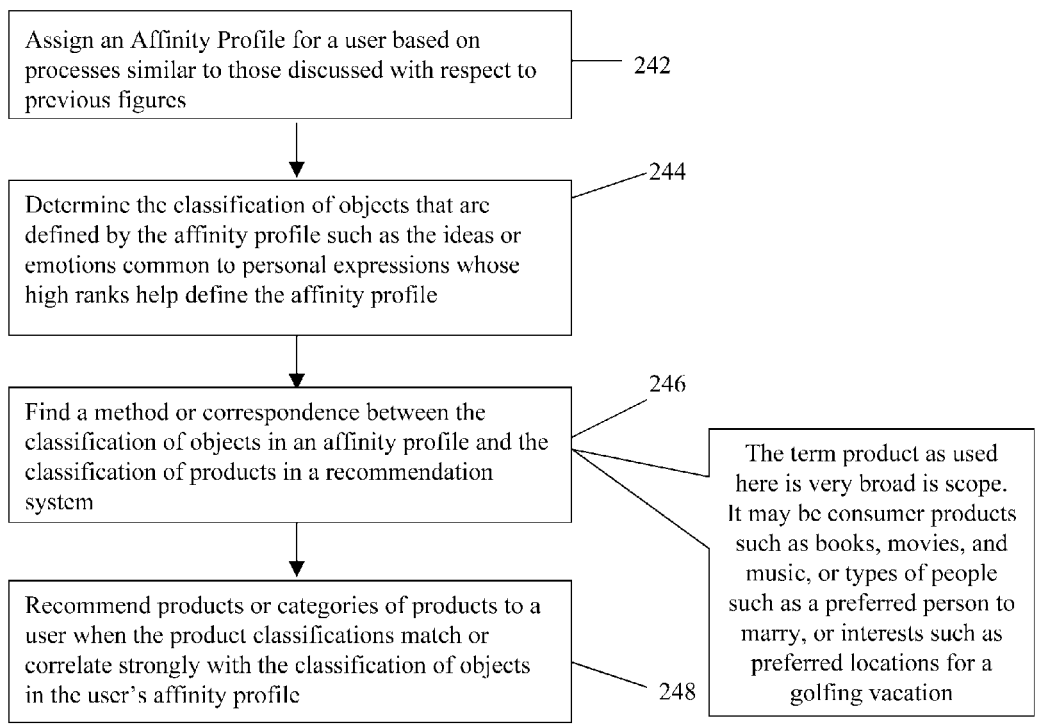

FIG. 27B is a flow chart representation of a way of using classifications within an affinity profile to expand recommendations for users who have an assigned affinity profile. According to 242 a user is assigned an affinity profile. According to 244 the affinity profile is analyzed to determine the classifications of the objects, which are central to the definition of the profile.

According to 246 a method of classifying products within a recommendation system is identified where the classification of products corresponds or can be correlated to the classification of objects in the affinity profile. Finally, according to 248 a recommendation to the user is made for products whose classifications are indicated by the affinity profile assigned to the user.

For example, an affinity profile may identify users who have a preference for personal expressions that fit into the classifications of heroic themes, and celebratory themes. Given a movie recommendation system, which identifies movies according to the primary theme of the movie, the affinity profile information may be used to recommend movies with heroic and/or celebratory themes.

What we claim is:

1. A computer based method implemented by at least one computer processor of developing user affinity knowledge, the method comprising:
    displaying a plurality of user-selectable objects on each of a plurality of user systems, each of the plurality of user-selectable objects associated with one or more meanings prior to selection by users;
    receiving, from a particular user, at least one selection of one or more of the plurality of the displayed user-selectable objects from each of the user systems wherein each selection creates a personal expression based at least in part on associated meanings of the one or more selected objects;
    analyzing time durations of when two or more user-selected objects of different data types are present simultaneously within the personal expression;
    analyzing direct proximity between the two or more user-selected objects of different data types to each other without consideration of any intermediate user-selected objects; and
    defining and storing at least one user affinity profile for the particular user, wherein
        the at least one user affinity profile indicates personal emotions of the particular user derived from the analyzing steps; and
        the receiving further comprises receiving a selection of the two or more user-selectable objects of the different data types from each of the user systems, wherein each object has a data type selectable from a group consisting of a word, an image, a video clip, an audio clip, and a symbol.

2. The method of claim 1, wherein each selection includes one or more of a placement of an object into the personal expression, repositioning of an object in the personal expression, and removal of an object from the personal expression.

3. The method of claim 1, wherein the at least one selection of the one or more of the plurality of user-selectable objects displayed includes each object being placed on top of a selected background object.

4. The method of claim 1, wherein the plurality of user-selected objects includes individual objects that are individually known to have strong affinities with users.

5. The method of claim 1, wherein analyzing includes a process selected from one or more of association mapping analysis, object frequency analysis, cluster mapping analysis, sub-cluster mapping analysis, K-means cluster analysis, Bayesian mapping analysis, personal expression rank ordering, object state rank ordering, maximum entropy modeling, graph theory, and generating a self-organized map.

6. The method of claim 1, wherein the analyzing includes analysis wherein user clusters are defined based upon users having similar associative characteristics.

7. The method of claim 1, wherein the at least one user affinity profile includes a plurality of user affinity profiles.

8. The method of claim 1, further comprising:
utilizing the at least one user affinity profile to define marketing content.

9. A computer system comprising at least a computer processor to execute a method of developing user affinity knowledge, the method comprising:
displaying a plurality of user-selectable objects on each of a plurality of user systems each of the plurality of user-selectable objects associated with one or more meanings prior to selection by users;
receiving, from a particular user, at least one selection of one or more of the plurality of the user-selectable objects from each of the user systems wherein each selection creates a personal expression based at least in part on associated meanings of the one or more selected objects;
analyzing time durations of when two or more user-selected objects of different data types are present simultaneously within the personal expression;
analyzing direct proximity between the two or more user-selected objects of different data types to each other without consideration of any intermediate user-selected objects; and
defining and storing at least one user affinity profile for the particular user, wherein
the at least one user affinity profile indicates personal emotions of the particular user derived from the analyzing steps; and
the receiving further comprises receiving a selection of the two or more user-selectable objects of the different data types from each of the user systems, wherein each object has a data type selectable from a group consisting of a word, an image, a video clip, an audio clip, and a symbol.

10. A non-transitory computer-readable storage medium having stored thereon instructions executable by at least one computer processor to implement a method of developing user affinity knowledge, the method comprising:
displaying a personal expression template on each of a plurality user systems, each personal expression template including a plurality of user-selectable objects each of the plurality of user-selectable objects being associated with one or more meanings prior to selection by a plurality of users;
receiving, from a particular user, a construction of a personal expression by a selection, placement, and arrangement of one or more of the plurality of the user-selectable objects from each user system, the personal expression being based at least in part on the associated meanings of the one more user-selected objects;
analyzing an order of the selection, placement, and arrangement of the user-selectable objects, wherein the analyzing comprises:
analyzing time durations of when two or more user-selected objects of different data types are present simultaneously within the personal expression; and
analyzing direct proximity between the two or more user-selected objects of different data types to each other without consideration of any intermediate user-selected objects; and
defining and storing at least one user affinity profile, wherein
the at least one user affinity profile indicates personal emotions of the particular user derived from the analyzing steps; and
the receiving further comprises receiving a selection of two or more user-selectable objects of different data types from each of the user systems, wherein each object has a data type selectable from a group consisting of a word, an image, a video clip, an audio clip, and a symbol.

11. The medium of claim 10, further comprising: determining a user preference for one or more of the user-selected objects.

12. The medium of claim 10, wherein analyzing the order of the selection, placement, and arrangement of the two or more user-selected objects includes analyzing a tendency for a particular sequence of objects to be selected.

13. An apparatus comprising at least one computer processor to execute a method of defining a user affinity profile comprising:
means for displaying a plurality of user-selectable objects on a user system, each of the plurality of user-selectable objects associated with one or more meanings prior to selection by users;
means for facilitating, at the user system, selection of one or more of the plurality of user-selectable objects to create a personal expression based at least in part on corresponding one or more associated meanings;
means for analyzing time durations of when two or more user-selected objects of different data types are present simultaneously within the personal expression;
means for analyzing direct proximity between the two or more user-selected objects of different data types to each other without consideration of any intermediate user-selected objects; and
means for defining and storing the user affinity profile, wherein
the at least one user affinity profile indicates personal emotions of the particular user derived from the analyzing steps; and
the receiving further comprises receiving a selection of two or more user-selectable objects of different data types from each of the user systems, wherein each object has a data type selectable from a group consisting of a word, an image, a video clip, an audio clip, and a symbol.

14. The apparatus of claim 13, wherein one or more user-selected objects are arranged within the personal expression in two dimensions.

* * * * *